Inventor
Thomas Meyrick Deakin
by Pech & Pech
Attorneys

Aug. 14, 1956 T. M. DEAKIN 2,758,513
MACHINE FOR FORMING OR MEASURING BEVEL GEAR TEETH
Filed April 14, 1950 5 Sheets-Sheet 5
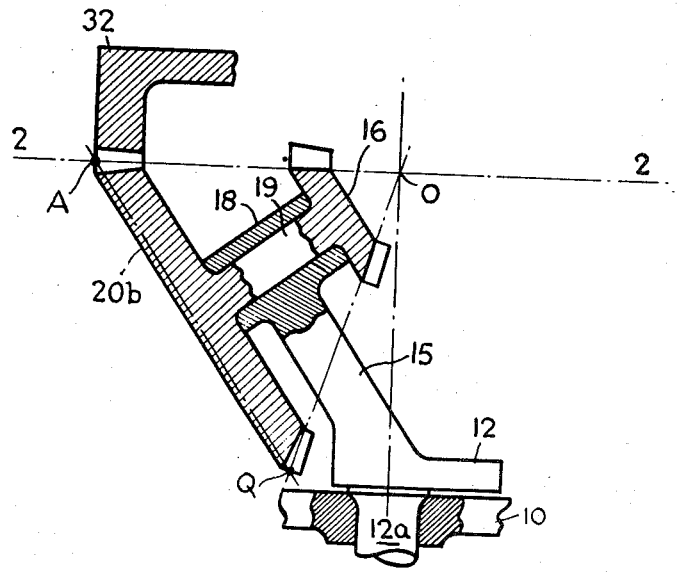
FIG. 9
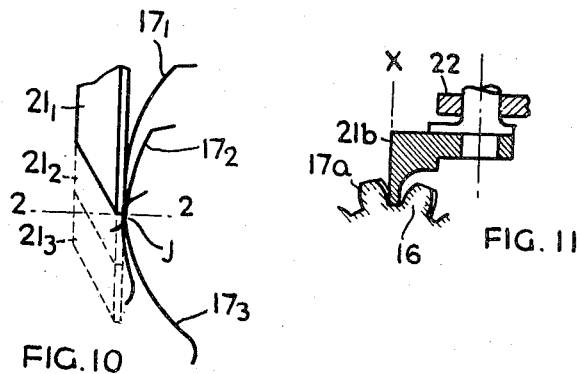
FIG. 10
FIG. 11
Inventor
Thomas Meyrick Deakin
by Peck & Peck
Attorneys

United States Patent Office 2,758,513

Patented Aug. 14, 1956

2,758,513

MACHINE FOR FORMING OR MEASURING BEVEL GEAR TEETH

Thomas Meyrick Deakin, Worcester, England

Application April 14, 1950, Serial No. 155,876

Claims priority, application Great Britain April 14, 1949

13 Claims. (Cl. 90—3)

This invention concerns machines for forming or measuring bevel gear teeth and has for an object to provide a simple mechanism for forming true involute profiles on the teeth of bevel gears. In the manufacture of spur gears it is known practice to form the flanks of the gear teeth to an involute curve so that, during intermeshing of the gears, the tooth flanks which transmit the load at any given time always make contact with one another along the line of action which is tangential to both involute base circles whereby the ratio between the speeds of the two gears always remains constant. In addition, the use of the involute curve enables the distance between centres of shafts coupled together with the intermeshing gears to be varied within the limits for intermeshing of the gear teeth without affecting the constancy of the speed ratio. It also provides a system of gearing whereby gears having the same diametral or circular pitch may mesh with each other, irrespective of the number of teeth.

In the practice relating to the manufacture of bevel gears, although it is known that the involute shape of tooth flank produces the same advantageous results, difficulty has been experienced in generating this shape accurately owing to the more complicated geometric construction involved. It has therefore been the practice to manufacture bevel gear teeth having a flank profile which approximates to a true involute. Such gears, however, must generally be manufactured in pairs which match with each other and this involves considerable additional expense. Moreover, if one gear of a pair becomes damaged and has to be replaced, it is necessary to remove also the other gear so that the new gear to be made can be matched therewith, or both gears must be replaced. This is a considerable drawback since it may involve dismantling much of the machine concerned and its withdrawal from useful work for the period required for making the new gear. Much time and expense would be saved if it were possible to manufacture bevel gears which are universally interchangeable with the certainty that they would accurately mesh with any other gear having the same diametral or circular pitch and the same cone distance, i. e. the teeth interengage at the same distance from the common cone apex.

In the generation of an involute profile for spur gear teeth a line or "involute generator" is regarded as fixed on a plane which is rolled from the circumference of a first disc, having a diameter equal to the involute base circle of the teeth of one gear and a width equal to the flank width of the gear teeth, on to the circumference of a second involute base circle disc for the other gear. The surface traced out in space by the said fixed line or generator relative to the base circle disc as the plane is rolled from the one disc to the other is a true involute profile, and if the gear teeth are formed to this profile, contact between each tooth flank will take place along the line of action and therefore the profile will transmit constant angular velocity ratio.

A similar consideration obtains in connection with bevel gears except that the involute base circle discs become truncated "involute base cones" (hereinafter referred to for brevity as the base cone) whose axes intersect at a point known in the art as the "apex" and constituting the centre of a circumscribing sphere, whilst the plane which is rolled from one cone to the other is of annular form. The circumference of this annular plane constitutes a great circle of the said sphere the circumferences of the bases of the base cones lying on the surface of the sphere.

The profile of a tooth generated on this principle has a true involute shape which can only be seen on a spherical surface of section, and whilst the advantages of the shape (termed herein the "spherical involute" shape) as mentioned above, have long been known, it has always been regarded as too complicated for commercial purposes, and an approximation has been preferred. This approximate profile, which is specified by the British Standards Institution, in Specification No. BSS.545/1949—"Bevel Gears (Machine Cut)"—is that which is produced by a cutting tool having a profile which is a counterpart of a single flank and root fillet of a basic rack. The latter is defined as the developed section of the teeth of the crown gear on the back cone, and this section has straight sided flanks having a pressure angle of 20°.

When two bevel gears having their teeth cut to this standard profile are in mesh, the point of contact between any one pair of contacting tooth flanks does not follow a straight line (the "line of action" of a true involute profile) but a curve known in the art as an "octoid." This results in greater noise and wear due to friction which reaches serious proportions where the bevel gears are run at high speeds. The working life of standard bevel gears under these conditions is undesirably short.

A further disadvantage of the said standard profile is that the above-mentioned drawbacks are enhanced if there is any deviation from its true position of the axis of either shaft of a pair connected by standard bevel gears.

It is a principal object of the present invention to provide a machine for generating (or for testing) the teeth of a bevel gear to a true spherical involute profile.

Another object of the present invention is to provide a machine for generating the teeth of a bevel gear to a true spherical involute profile which can be operated on a quantity production basis.

The present invention resides in the utilisation of this geometric construction by providing that the gear on which the teeth are to be formed or measured, is rotated about its own axis and about the centre of the great circle representing the said annular plane in a manner equivalent to the motion derived by rolling the plane around the base cone of the gear, and a forming or measuring tool is located or reciprocated along the involute generator during the said rotation of the bevel gear.

The present invention accordingly provides a machine for forming or measuring a true involute profile on a bevel gear tooth which comprises a fixed frame part in which is mounted a first or great circle disc representing the annular plane which is rolled from one base cone to the other, a rigid straight-edged slide which is mounted in a carrier pivoted about the axis of the great circle disc and is connected in non-slipping relation to the circumference of the said disc, a second disc representing the base cone of the gear rotatably mounted on the carrier and connected in non-slipping relation to the straight edged slide means for securing the gear to be formed or measured co-axially to the base cone disc, and a forming or measuring tool mounted to be traversed along the involute generator.

The forming tool may be of the single or multiple point type or it may be constituted by a hone or grinding wheel. In the latter case it may be preferred to reciprocate the wheel in a direction normal to the plane containing the involute generator so that the point of contact between the flank of the tooth being generated and the grinding surface moves with respect thereto, thus preventing excessive local wear of the wheel. A similar consideration applies in the case where the tool has a cutting edge extending in the direction of the height of the tooth or is constituted by a measuring member or "feeler."

Where the teeth of the bevel gear are straight and disposed radially with respect to the sphere on which the bases of the base cones lie, the first or great circle disc is locked in the frame of the device. Where, however, the teeth are disposed at an angle to the radius of the great circle, or are curved along their length, the great circle disc may be rotatable about its axis under the control of suitable mechanism. Furthermore, the path of the tool may be modified in accordance with the shape of the tooth, as, for example, when the teeth are curved lengthwise as in spiral bevel gears.

Examples of ways of carrying the invention into effect will now be described with reference to the accompanying drawings in which:

Fig. 9 illustrates a modification of the machine of Fig. 3;

Fig. 10 is a diagram illustrating the displacement of the tool in the direction of the height of the tooth to avoid excessive wear at one point of the tool, and Fig. 11 is a fragmentary section showing a method of machining the curved teeth of a spiral bevel gear.

Figure 1:
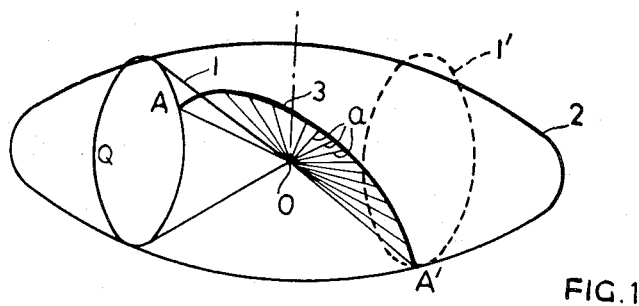
Fig. 1 illustrates the geometrical construction of a spherical involute tooth profile for a bevel gear.

In Fig. 1 of the drawings, the base cone 1 of a bevel gear is in contact with a plane 2 (shown bounded by a circle of radius equal to the slant height of the cone 1), the plane being assumed to roll against the cone. The curve 3 represents the locus of a point A on the plane 2 at the point where it touches the base AQ. The curve 3 is an involute, and lies on the surface of a sphere having its centre at O which is the apex of the cone 1.

If the cone 1 rolls to the position 1¹, the involute 3 will always be normal to the base AQ, and at each successive position of the cone 1 a straight line may be drawn from the apex O to meet the curve in the point A. A family of such lines is shown at OA, Oa, OA'. These lines, by definition, always lie in the plane 2 as the latter rolls around the cone 1, and define a surface which is a true or spherical involute, the profile of which can only be accurately represented on a spherical surface of section. The lines Oa are involute generators.

Figure 2:
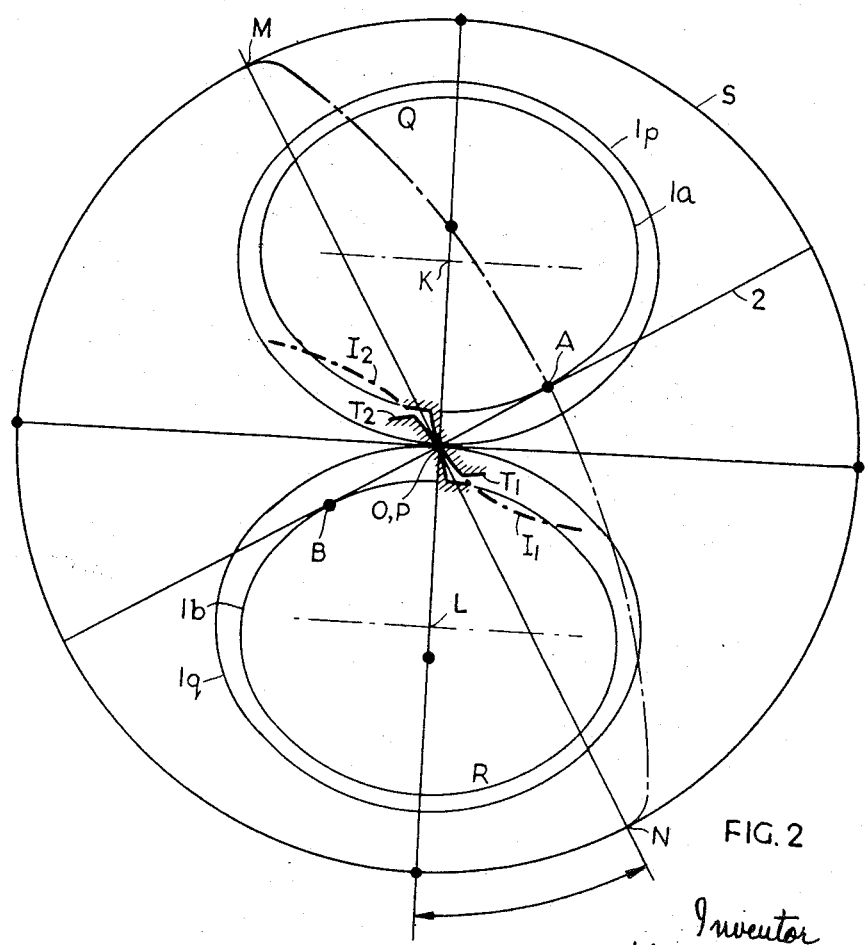
Fig. 2 illustrates the geometry of two intermeshing bevel gears having teeth whose profiles are true spherical involutes.

Referring now to Fig. 2 of the drawings, two meshing bevel gears are represented by their respective base cones 1a, 1b. Their corresponding pitch cones are shown at 1p, 1q, and are tangential at the point P. In this figure, the point P, sometimes referred to as the pitch point, is coincident with the apex O, although it will be understood that in fact the point O is distant from the point P by the slant height of the pitch cones 1p, 1q in a direction normal to the plane of the figure. The base cones 1a, 1b are tangential to the plane 2 which cuts the sphere S in a great circle. The plane 2 contains both the apex O and the pitch point P, and also the line of action APB which is perpendicular to the line MPN. This latter line makes an angle with the line KPL drawn through the centres of the bases of the cones 1p, 1q, this angle being termed the "pressure angle." The pressure angle is usually of the order of 20°, and serves to determine the flank profile of the gear teeth. The circumscribing sphere on the surface of which all the lines of the above construction are to be understood as drawn is represented by the circle S.

The profiles $I_1$ and $I_2$ of a pair of mating gear teeth $T_1$, $T_2$ are both tangential to the pressure angle line MPN, the curves corresponding to the curve 3 of Fig. 1. Since each of these curves represents the locus of a point on the plane 2 as the plane is rolled past the respective base cone 1a or 1b, they are spherical involute curves, and lie on spherical involute surfaces whose generators are radii of the sphere S. One particular generator position is represented by the line OP which is common to both tooth profiles $I_1$ and $I_2$, and since both these profiles are spherical involute curves, they intersect the line APB so that the tangent at the point of intersection is perpendicular to the said line. From this it follows that the locus of the point of contact between the profiles of any pair of mating teeth such as $T_1$ and $T_2$ as the gears rotate is the straight line APB. Also, as the gears rotate, a generator of each spherical involute tooth flank lies in the plane 2.

The foregoing analysis refers specifically to straight bevel gears—that is, gears having teeth whose axes are radial with respect to the axis of the bevel gear. It will be understood, however, that similar considerations apply to spiral bevel gears, whether the teeth are straight—i. e. their axes are tangential to a circle concentric with centre O of the circumscribing sphere—or are curved. By an extension of the geometry set out above, it can be shown that the generator of a spherical involute tooth flank for a spiral bevel gear is a line which lies in the plane 2. The common feature of the three types of gear mentioned above is, therefore, that the generators of the flanks of the teeth whose profiles are spherical involute curves will always lie in the plane 2. The present invention accordingly seeks to embody this principle in a machine for the manufacture of bevel gears.

Figures 3, 4:
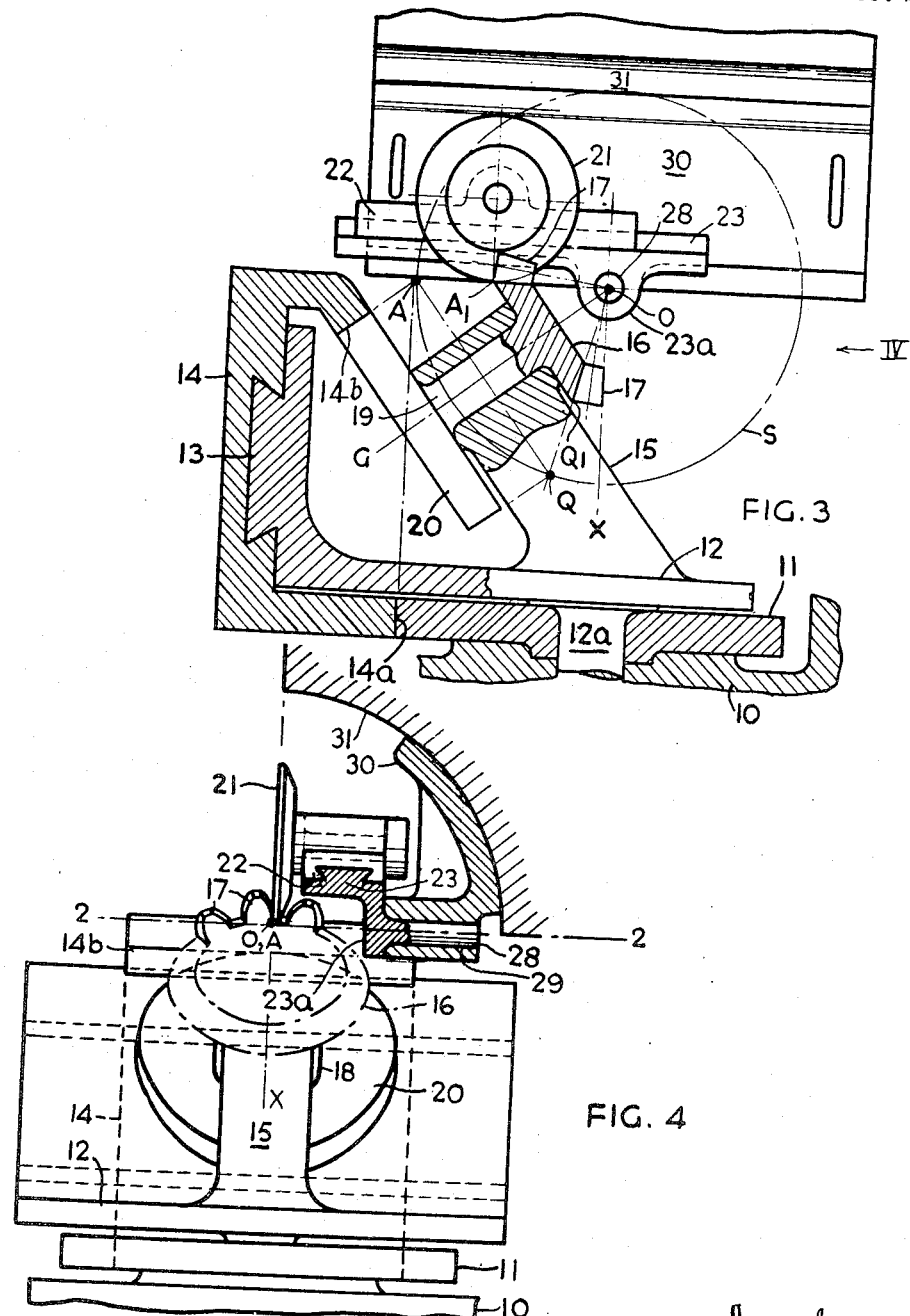
Fig. 3 is a partial axial cross-sectional view of a schematic arrangement of machine embodying the principle of the invention.
Fig. 4 is a fragmentary sectional elevation seen in the direction of the arrow IV of Fig. 3.
Figure 5:
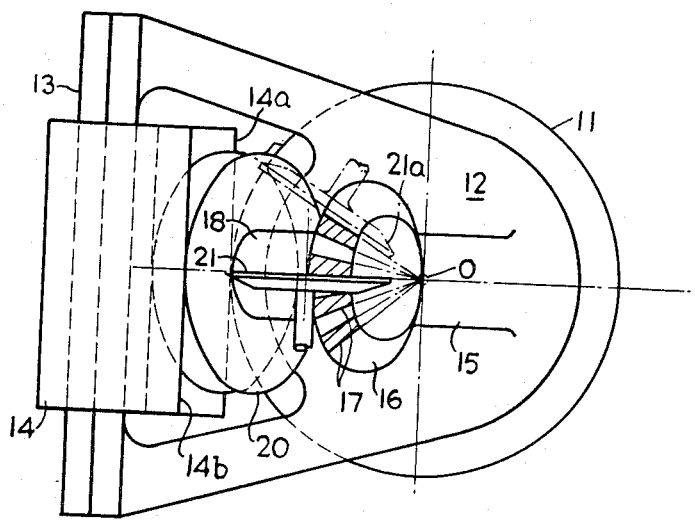
Fig. 5 is a fragmentary plan view of Fig. 3, the teeth being shown in section on the surface of the base cone of the gear.

Figs. 3, 4 and 5 are schematic fragmentary illustrations of a basic mechanism for carrying the invention into effect. Referring again to Fig. 2, and assuming that the blank for a bevel gear whose teeth are to be formed with spherical involute profiles is made of a plastic substance of a putty-like consistency, then the desired profile would be generated by rotating the blank about its cone axis and at the same time traversing relatively thereto a rigid wire representing the involute generator in the plane 2 from a position outside the blank—say, beyond the point B with respect to the gear represented by the cone 1a—up to the point (A) where the plane 2 is tangential to the base cone. Thus, the basic mechanism provides a tool and means for traversing the blank relatively thereto with such motion that the tool always makes contact with the flank of a tooth along a spherical involute generator.

The machine comprises a rigid frame 10 containing a fixed vertical axis OX. On the frame is mounted a fixed or "great circle" disc 11 which is concentric with the said fixed vertical axis. Adjacent to this disc 11 and above it is mounted a sub-frame 12 which is oscillatable about the fixed axis OX by means of the shaft 12a, and has rigidly connected thereto a horizontal guideway 13 on which is mounted a straight rigid slide 14 which is connected at a rectilinear edge 14a in non-slipping relation to the circumference of the great circle disc 11, the arrangement being such that on oscillation of the subframe 12 about the fixed vertical axis OX, the slide 14 is reciprocated along the guideway 13 on the sub-frame.

The sub-frame 12 supports a carrier 15 for the gear 16, the teeth 17 of which are to be formed or measured. This carrier is provided with a bearing 18, the axis OG of which is located so as to intersect the fixed vertical axis in a point O which represents the geometrical apex O of Figs. 1 and 2. Hence, the point O is the centre of the imaginary sphere S on the surface of which lies both the circumference AQ of the base of the base cone OAQ for the teeth 17 to be formed or measured on the gear, and the circumference of the great circle representing the geometrical plane 2 which, in the construction of Figs. 1 and 2, is regarded as containing the involute generator OA, and on which the base cone OAQ is assumed to roll to form the involute profile of a gear tooth 17.

The carrier bearing 18 receives a stub shaft 19 on which is secured the gear 16. The stub shaft 19 also has fixed thereto a disc 20 which represents the base cone OAQ of the gear 16 and has a diameter equal to the diameter of the base AQ. This base cone disc 20 is connected in non-slipping relation to a rectilinear edge 14b on the slide 14 so that it is constrained to rotate about the axis OG of the stub shaft 19 when the slide 14 is reciprocated in the sub-frame 12.

In the construction so far described, the gear on which teeth having true involute profiles are to be formed or measured is mounted on an axis which always passes through the apex. The circumference of the base cone of the teeth on this gear must therefore always lie on the surface of an imaginary sphere having its centre at the said apex. In the geometrical construction shown in Figs. 1 and 2, the great circle plane 2 containing the involute generator OA, and which is tangential to the base cone OAQ, is regarded as having an outer radius equal to the radius of the sphere S containing the circumference of the base AQ of the base cone. In order to allow for the necessary clearances between the several working parts of the machine, it is advantageous to regard the base cone OAQ of the gear 16 as being extended beyond the actual outer end or base of the gear 16 by a convenient amount so that the base cone disc 20 has a diameter equal to AQ which is proportional to the diameter $A_1$, $Q_1$ of the base circle of the teeth 17 on the gear 16 at their outer ends. The base cone disc 20 thus represents the imaginary base AQ of the base cone of the gear 16, and this imaginary base lies on the circumference of an imaginary sphere S of greater radius than that on which the actual base of the gear 16 lies. The diameter of the great circle disc 11 is thus equal to the diameter of this larger sphere and the edge 14a lies in a vertical plane containing the point A. The correct geometrical relationship is thus maintained between the sphere S and the base cone OAQ and enables the motion of the base cone disc 20 to be accurately derived from the great circle disc 11 through the intermediary of the slide 14.

A forming tool, represented as a grinding wheel 21, is mounted on a slide 22 for reciprocation on a guideway 23 carried on the machine frame 10. The tool slide 22 is reciprocated by suitable driving mechanism (not shown) in a generally radial direction so that the tool 21 mounted thereon is traversed past the gear 16 in such a way that the point of contact at any given instant between the tool 21 and the flank of a gear tooth 17 lies on the involute generator OA for that tooth.

In order to impart feed to the tool 21, the guideway 23 is mounted so as to pivot about an axis perpendicular the fixed axis OX. The tool 21, shown in Figs. 3 and 4 as a grinding wheel, is thus able to be displaced towards and away from the tooth flank, it being understood that the extent of such feed motion would normally be small—sufficient to remove the excess metal from the teeth of a rough-formed gear blank.

It will be understood from the above description that oscillation of the sub-frame 12 about the fixed axis OX—as by oscillation of the shaft 12a—causes oscillation of the gear 16 both about its own axis OG and about the fixed axis OX in such a way that the flank of a tooth 17 having a true involute profile is always tangential to a fixed vertical plane containing the involute generator OA which also always lies in a horizontal plane 2 containing the apex O. The necessary geometrical relationships between the gear 16 and the forming or measuring tool 21 are thus always maintained. Furthermore, the fact that the flank of a tooth being formed is always tangential to a given vertical plane (containing the line MAN, Fig. 2) enables a single point tool to be moved vertically in this plane as the gear 16 rotates so that a vertically elongated cutting edge may be employed, thus avoiding tool wear at one point only and prolonging the life of the cutting edge. For the same reason a grinding wheel 21 having a flat vertical grinding face can be used and similarly moved. This vertical movement of the tool 21 relatively to the plane 2 is illustrated in Fig. 10 which shows three separate relative positions of the tool 21 and a tooth 17. As the tooth 17 rolls against the tool 21 from an initial position $17_1$ through an intermediate position $17_2$ to a final position $17_3$, the point of contact J between the tool and the tooth remains in the plane 2—2. The tool 21, however, may be moved downwards from the initial position $21_1$ to the final position $21_3$, it being apparent that the point J then moves along the tool 21, and it will be seen from Fig. 10 that the basic geometry of the method is not changed by this arrangement.

The forming tool may be of the usual single point type or it may be constituted by a grinding wheel. In the former case, the mechanism for reciprocating the tool slide 22 on the guideway 23 is arranged to give a high speed of traverse of the tool 21 across the tooth flank whilst the mechanism for oscillating the sub-frame 12 is of an intermittently operating nature. Thus, the gear 16 is held stationary during the cutting stroke of the forming tool 21, and the frame 12 is then moved through a pre-determined angle to rotate the gear 16 by the desired amount before the tool 21 makes the next cut.

Where the forming tool 21 is constituted by a grinding wheel, the mechanism for oscillating the tool slide 22 is arranged to give a slow speed of traverse whilst the mechanism for oscillating the sub-frame 12 is of a continuous nature to give the gear 16 a relatively high speed of rotation about its axis OG.

A second tool 21a (Fig. 5) may be provided, the mounting for which is in all respects similar to that of the tool 21 except that the tool 21a is located on the opposite side of a tooth so that the tool forms or measures an oppositely directed flank. Whilst this latter flank may in some cases be the opposite flank of the same tooth 17 as that which is being formed or measured by the first tool 21, it will in general be on another tooth.

Figure 6:
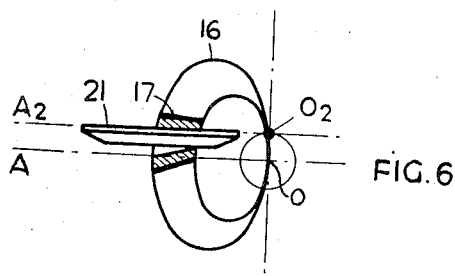
Fig. 6 is a view similar to Fig. 5 illustrating the machining of a skew gear.

In the above described form of machine, it has been assumed that the teeth 17 to be formed or measured are straight and directed radially with respect to the apex O. It will, however, be understood that in certain circumstances gear teeth of other forms may be required. For example, the teeth may be required to be straight but skewed with respect to a radius passing through the apex O. In such a case, the tool 21 is mounted so as to move along an involute generator $O_2A_2$ (Fig. 6) which is tangential to a circle concentric with the apex O and to which the directions of the skewed teeth are also tangential.

Figure 7:
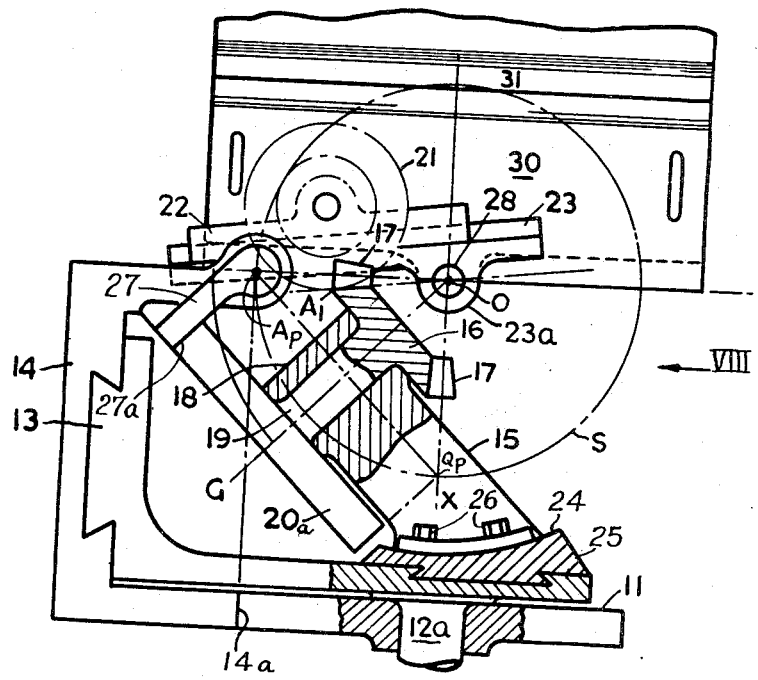
Fig. 7 illustrates the way in which the mechanism of Fig. 3 may be modified to enable a standard profile to be machined if desired.
Figure 8:
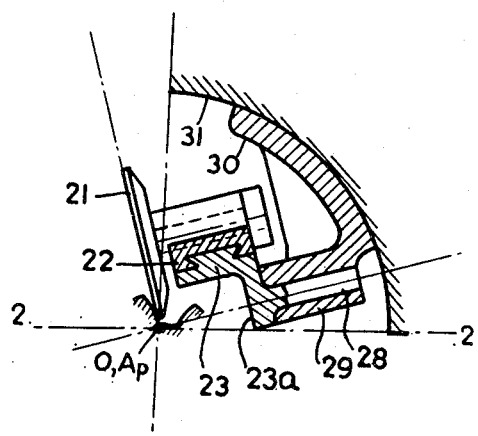
Fig. 8 is a fragmentary view similar to Fig. 4 of the arrangement shown in Fig. 7.

The mechanism illustrated in Figs. 3–5 can be readily modified to machine a standard tooth profile. This is a valuable feature of the invention, since it renders the mechanism of universal utility. Figs. 7 and 8 illustrate the modifications.

The standard tooth profile is based on the pitch cone $1_p$ or $1_q$ of Fig. 2. The gear 16 must, therefore, be reset in the machine so that its pitch cone $OA_pQ_p$ lies tangential to the plane 2—2. This resetting is achieved by mounting the carrier 15 and its bearing 18 as a unit on an arcuate seating 24 struck about the apex O. This seating 24 is formed on a cross-slide 25 whereby the gear 16 may be bodily displaced so that its axis OG intersects the plane 2 in a point $O_2$ (Fig. 6) lying on the diameter of the sphere S which is perpendicular to the line OA. The tool or wheel 21 is moved in the same direction through the distance OO₂ so as to be traversible along the involute generator O₂A₂ parallel to the line OA. Clamping bolts 26 retain the carrier 15 in the desired position of adjustment.

The former cone base AQ which determined the size of the base cone disc 20 has now become extended to A_pQ_p, so that a larger base cone disc 20a is required. The edge 14b is replaced by a bail 27 pivoted to the slide 14 about an axis in the plane 2 and containing the point A_p. The bail 27 has a surface 27a which is radial with respect to its pivotal axis, and suitable means is provided for clamping the bail 27 at the desired angle so as to engage tangentially the circumference of the pitch cone disc 20a.

The guideway 23 is supported—as by the bracket 23a—on a trunnion 28 whose axis passes through the apex O so that the said guideway may be tilted to the same inclination as the root cone generator OA. The trunnion 28 is carried in a bearing 29 which is slung from a slide 30 working in an arcuate guide 31 on the machine frame 10. The guide 31 is curved about the line OA_p as axis. This enables the tool or wheel 21 to be set over to the pressure angle, as seen in Fig. 8. The mechanism thus generates the standard profile when the sub-frame 12 is oscillated and the tool or wheel 21 reciprocated along the guideway 23.

Where teeth of arcuate shape are to be generated, it is preferred to employ a horizontally disposed cup-shaped grinding wheel (Fig. 11) which is rotated about a vertical axis and the outer periphery 21b of which is in contact with the flank of the tooth 17a. The radius of the said outer periphery 21b of this wheel may be equal to the radius of the tooth 17a, or alternatively it may be less than this radius and the centre of the wheel may be swung about the centre of curvature of the tooth 17a. This latter arrangement is preferably adopted to allow for truing of the grinding wheel at the necessary intervals.

Although in the above description reference has been made to great circle and base cone "discs," it is to be understood that these discs 11, 20 or 20a are of finite thickness, and are preferably, although not necessarily, of relatively great thickness so as to form in effect short cylinders. They may also be of any desired form other than solid. Each disc 11, 20 or 20a may be replaced by a sector having an angle not less than the angle through which relative movement between the inter-engageable parts takes place.

Any alternative form of driving engagement between the discs 11, 20 or 20a and the slide 14 may be adopted as preferred. For example, the slide 14 may be provided with rack teeth in place of the surfaces 14a, 14b, and the periphery of each disc 11, 20 or 20a may be correspondingly toothed.

In the alternative construction, shown in Fig. 9, a great circle member—for example a rigid arcuate member 32—is mounted in the true geometrical plane 2 containing the involute generator OA to engage directly, in non-slipping relation, a base cone disc 20b mounted on the stub shaft 19 and having the same pitch circle AQ as the base cone disc 20. Although in Fig. 9 the members 20b and 32 are shown toothed, any convenient means may be used to ensure a non-slipping relation between them.

In the examples of machine according to the invention which have been described above, the axis OG of the gear 16 to be formed has been assumed to intersect the axis of the gear with which it is to mesh. Where, however, it is desired to form a hyperboloidal gear (frequently termed a "hypoid" bevel gear) the axis OG of the gear 16 to be formed is offset with respect to the fixed axis OX. It then intersects the plane 2 containing the apex O and the involute generator OA at a point lying on the circumference of a circle contained in the plane 2. As before, the tool 21 is caused to move along the line of the involute generator OA.

Throughout the specification, the term "forming" is to be understood as including both generating a tooth profile from a plain gear blank or finishing a roughly formed blank. The forming operation may be a cutting, broaching, grinding, lapping or like operation as desired.

The drive to the machine is preferably applied to the oscillatable sub-frame 12, although if preferred this frame may be fixed and the necessary motions imparted to the other parts of the machine. Alternatively, the sub-frame 12 may carry a driving motor which reciprocates the slide 14 through any convenient known form of mechanism.

Where the terms "vertical" and "horizontal" have been used in the foregoing specification, they are to be understood as having relative rather than absolute significance.

Although the machine has been described primarily for the purpose of generating true involute tooth profiles on bevel gear teeth, it will be understood that it may be used, if desired, for the generation of modified tooth profiles by providing for the necessary modifications of the rotary feed motion of the gear being cut, or by any other convenient method.

In this specification the term "tooth flank" is to be understood as referring to that zone of the tooth which may make driving contact with a corresponding tooth on the intermeshing gear wheel and which is comprised between the involute base circle and the tip of the tooth. This zone is sometimes referred to as the tooth "surface."

What I claim is:

1. A machine for generating the profile of a bevel gear tooth flank comprising a first rigid member having an arcuate peripheral portion of a radius equal to the radius of a preselected imaginary circumscribing sphere drawn on the gear apex as centre, a second rigid member fixedly coupled to the gear blank and having an arcuate peripheral portion of a radius equal to the radius of the base cone of the gear blank where it intersects the said circumscribing sphere, a single rigid rectilinear slide assembly having two straight parallel operative portions respectively engaged in non-slip relationship with the arcuate portions of the first and second rigid members, a guideway for supporting the rectilinear slide for reciprocation in the direction of length of its straight parallel portions and for bodily angular displacement around the axis of the arcuate portion of the first rigid member, and a tool traversible across the gear blank in a plane normal to the generating plane to generate the tooth flank profile.

2. A machine as claimed in claim 1 wherein the tool is further reciprocable in the plane of traverse thereof and in a direction perpendicular to its direction of traverse relative to the gear blank.

3. A machine for forming the teeth of a bevel gear comprising a first and fixed rigid member representing a reference plane and having an operative portion of its periphery formed as an arc of a circle, a carrier for rotatably supporting the gear in a position relative to the plane such that the plane is tangential to the involute base cone of the gear, a second and circular rigid member having an effective diameter equal to that of the geometrical base of the said base cone, the said operative portion of the periphery of the first rigid member having a diameter equal to that of the circumscribing sphere which can be drawn about the cone apex of the gear and at whose surface lies the said geometrical base of the involute base cone of the gear, a rigid coaxial connection between the gear and the second rigid member, a non-slip connection between the operative portion of the periphery of the first rigid member and the effective periphery of the second rigid member, means for rotating the said carrier and first rigid member relatively to each other about an axis normal to the reference plane and containing the centre of the said circumscribing sphere, a tool mounted so as to make contact with a tooth flank of the gear only along a spherical involute surface generator contained in the said plane, and means for traversing the tool relatively to the tooth flank along the said involute generator and in a plane normal to the generating plane.

4. A machine as claimed in claim 3 having means for reciprocating the tool relatively to the tooth flank in a direction normal to the reference plane.

5. A machine as claimed in claim 3 wherein the first and second rigid members are constituted by discs the radius of the said first member being equal to the radius of the circumscribing sphere and the diameter of the said second member being equal to the diameter of the geometrical base of the base cone.

6. A machine as claimed in claim 5 wherein the two discs are interconnected in non-slipping relationship by means of a straight rigid member slidably supported on the gear carrier and having two parallel edges, each being in non-slipping engagement with a respective one of the two discs.

7. A machine as claimed in claim 3 wherein the gear carrier supports the gear in a position such that the axis of the gear intersects the reference plane at the centre of the circumscribing sphere.

8. A machine as claimed in claim 3 wherein the gear carrier is adjustable in a direction parallel to the reference plane and perpendicular to the direction of traverse of the tool.

9. A machine for forming the flank of a bevel gear tooth to a true involute profile comprising a first disc representing the generating plane which is tangential to both involute base cones of the said gear and another gear with which it is to mesh, a carrier for the said gear, means for supporting the gear on the carrier for rotation about its own axis and in a position such that the said axis makes an angle with the said plane equal to half the cone angle of the involute base cone, a second disc rigidly connected to the said gear and coaxial therewith, the diameter of said second disc being equal to the diameter of the geometrical base of the base cone, means for rotating the gear carrier relatively to the first disc about the axis of the latter, means for interconnecting the peripheries of the discs in non-slipping relationship, a tool mounted with its operating portion lying in a plane normal to the generating plane so as to make contact with a tooth flank of the said gear on an involute generator lying in the said generating plane, and means for traversing the tool in the direction of the said involute generator.

10. A machine as claimed in claim 9 having means for reciprocating the tool in a direction normal to the said generating plane.

11. A machine as claimed in claim 3 having means for adjusting the position of the gear relative to the reference plane so that the latter is tangential to the pitch cone of the gear, means for adjusting the second and circular rigid member so that its effective diameter is equal to that of the geometrical base of the said pitch cone, and means for adjusting the tool mounting so as to present the tool to the tooth flank at an angle to the normal to the reference plane equal to the pressure angle of the tooth profile.

12. A machine as claimed in claim 3 wherein the first rigid member comprises a crown gear having its pitch surface lying in the reference plane and the second rigid member comprises a bevel gear meshing with the crown gear and having a pitch circle diameter equal to the diameter of the geometrical base of the base cone of the gear.

13. A machine as claimed in claim 3 having means for displacing the tool perpendicular to its path of traverse and parallel to the generating plane in a direction towards the tooth flank in engagement therewith when the tool engages the tip of the tooth by an amount sufficient to impart a desired tip relief to the tooth.

References Cited in the file of this patent

UNITED STATES PATENTS

| | | |
|---|---|---|
| 547,571 | Warren | Oct. 8, 1895 |
| 1,040,685 | Humphries | Oct. 8, 1912 |
| 1,588,560 | Trbojevich | June 15, 1926 |
| 2,342,129 | Elbertz | Feb. 22, 1944 |
| 2,401,810 | Aeppli | June 11, 1946 |

FOREIGN PATENTS

| | | |
|---|---|---|
| 501,314 | Great Britain | Feb. 24, 1939 |